United States Patent [19]

Cser et al.

[11] 4,102,181

[45] Jul. 25, 1978

[54] PROCEDURE FOR DETERMINING THE STARTING POINT OF FUEL INJECTION ESPECIALLY FOR RUNNING INTERNAL-COMBUSTION ENGINES

[75] Inventors: Gyula Cser, Budapest; Géza Mizser, Cegléd; Péter Rausnitz; Zoltán Székely, both of Budapest, all of Hungary

[73] Assignee: Autóipari Kutató Intézet, Budapest, Hungary

[21] Appl. No.: 753,008

[22] Filed: Dec. 21, 1976

[30] Foreign Application Priority Data

Dec. 23, 1975 [HU] Hungary ................................ AU 352

[51] Int. Cl.[2] ............................................ G01M 15/00

[52] U.S. Cl. .................................. 73/119 A; 324/16 T

[58] Field of Search ..................... 73/119 A; 324/16 T

[56] References Cited

U.S. PATENT DOCUMENTS

| | | | |
|---|---|---|---|
| 3,289,077 | 11/1966 | Miller | 73/119 A |
| 3,731,527 | 5/1973 | Weaver | 73/119 A |
| 3,775,672 | 11/1973 | Letosky | 324/16 T |

*Primary Examiner*—Anthony V. Ciarlante

[57] ABSTRACT

Process for determining the starting point of fuel injection in internal-combustion engines having a fuel-injection nozzle with a housing and a needle valve and a displacement limited by a stroke limiter, comprising the steps of observing and consecutively registering vibrations and/or noise phenomena arising from abutments of the needle in the valve against the stroke limiter, and selecting the leading branch or ascending flank of a first half-wave signal from that vibration, the registering being accomplished with a sensing element placed at least in the vicinity of the nozzle housing. Several additional, optional features are disclosed.

5 Claims, 2 Drawing Figures

Figure 1:
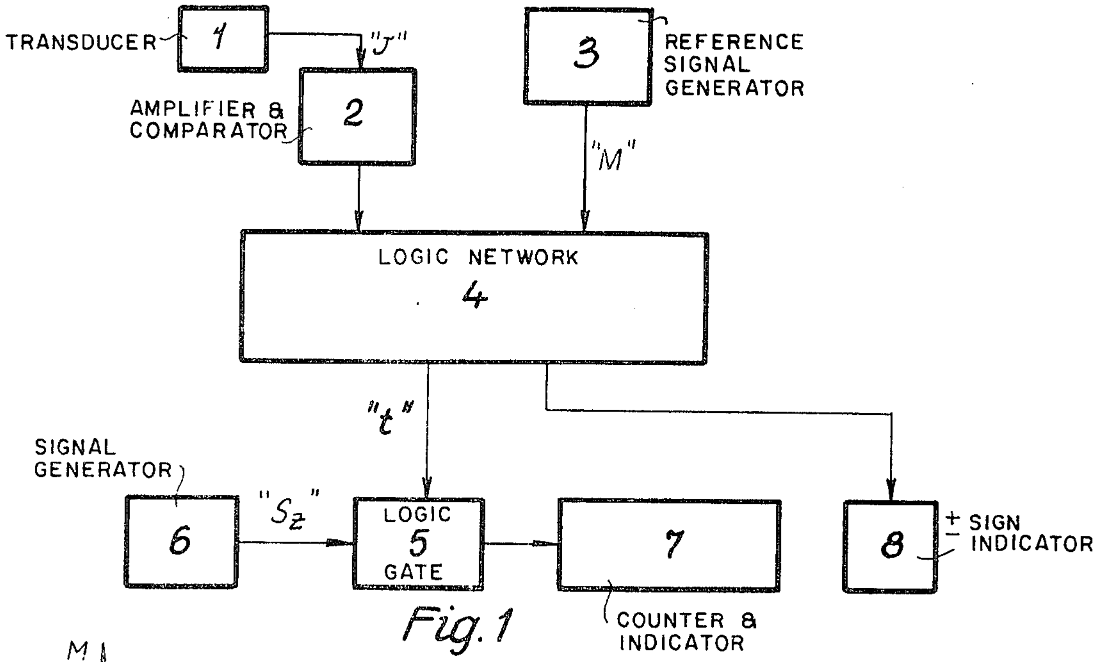

PROCEDURE FOR DETERMINING THE STARTING POINT OF FUEL INJECTION ESPECIALLY FOR RUNNING INTERNAL-COMBUSTION ENGINES

The subject of the invention is a measuring process for the determination of the starting point or commencement of fuel injection in running internal-combustion engines, mainly in Diesel engines.

In practice for Diesel engines two methods are used for measuring, during operation, the starting point of fuel injection and the position expressed in terms of the angular position of the shaft of the engine.

According to one method the displacement of the injection nozzle needle is measured by means of a suitable displacement indicator, and the angular position at the beginning of the motion is considered as the starting angle of the injection.

According to another method the pressure of the fuel in the injection system is measured by means of a pressure gauge built into the injection pipe, and from the course of the development of the injection pressure the angular position of the starting point of the injection is determined.

Both methods require dismantling of the fuel injection system which, in the case of the first method, is cumbersome and possibly a potential source of error, and in the case of the second method, requires only the injection pipe to be dismantled, but the result thus obtained is not sufficiently accurate.

The object of this invention is to develop a measuring process with which the determination of the starting point and the angular position of the injection process can be effected without the disassembly of the fuel supply system.

The process according to the invention is based on the recognition that at the start of the injection process the needle valve of the fuel injection nozzle abuts against a stroke limiter mounted on the nozzle housing, and this is associated with a measurable vibration phenomenon. The vibrations generated by the impact, both as regards their amplitude and their frequency, can be readily distinguished from vibrations caused by the operation of the engine and from other vibrations originating in the environment.

The present invention relates to a process for the determination of the commencement of fuel injection in internal-combustion engines having a fuel injection nozzle needle valve and stroke limiting means, wherein the time of opening is determined from the signal of a vibration sensor placed on the nozzle housing or nozzle holder or in the vicinity thereof, and sensing the vibrations or noise arising from the abutment of the needle against the stroke limiting means.

To ascertain the commencement and the angular position of the injection process, a first signal associated with the opening of the injection nozzle is compared with a reference signal generated in a known angular position, expediently at the dead point of the engine crankshaft, pre-injection the pre-injection angle is determined by a difference in time or in angular displacement.

According to experiences in measurement, the electric signal of a sensor for sensing the acceleration of vibrations per injection cycle up to the abutment of the nozzle needle has a constant level of a low wavelength while the signal indicative of the vibration generated by the impact has a characteristically large amplitude and high frequency a first ascending flank (half wave) of which indicates the moment of impact of the needle.

This measuring process has the added advantage that the full opening of the bore of the injection pipe is ascertained, thus the process is to some extent also suitable for monitoring the fuel injection process.

As a vibration sensing element one may use a vibration acceleration indicator arranged on the nozzle housing or a microphone arranged directly adjacent the nozzle housing. The arrangement of the vibration acceleration indicator requires no special manipulation and can be fixed to the nozzle housing e.g. by means of a snap connector device or by a permanent magnet. The ease of mounting of the sensor and the fact that it does not need to be dismantled enables the measurement to be carried out on an engine mounted in a vehicle or on a test bench or on an injection system arranged on a test bench. The vibration sensing elements can be individually and simultaneously arranged on several or all injection nozzles of the engine so that the operation of all injection nozzles can be quickly monitored.

The determination of the pre-injection angle and pre-injection period on a running engine is achieved through evaluation of signals per revolution from a signal generator mounted on the main engine shaft, or on another shaft of the engine with an r.p.m. proportional to the main shaft r.p.m., expediently at a dead centre portion of the piston, as well as by evaluation of the signals indicative of the start of injection. By comparing the simultaneously received signals from several injection nozzles the mutual time displacement and angular displacement of the injections can also be obtained.

Figure 2:
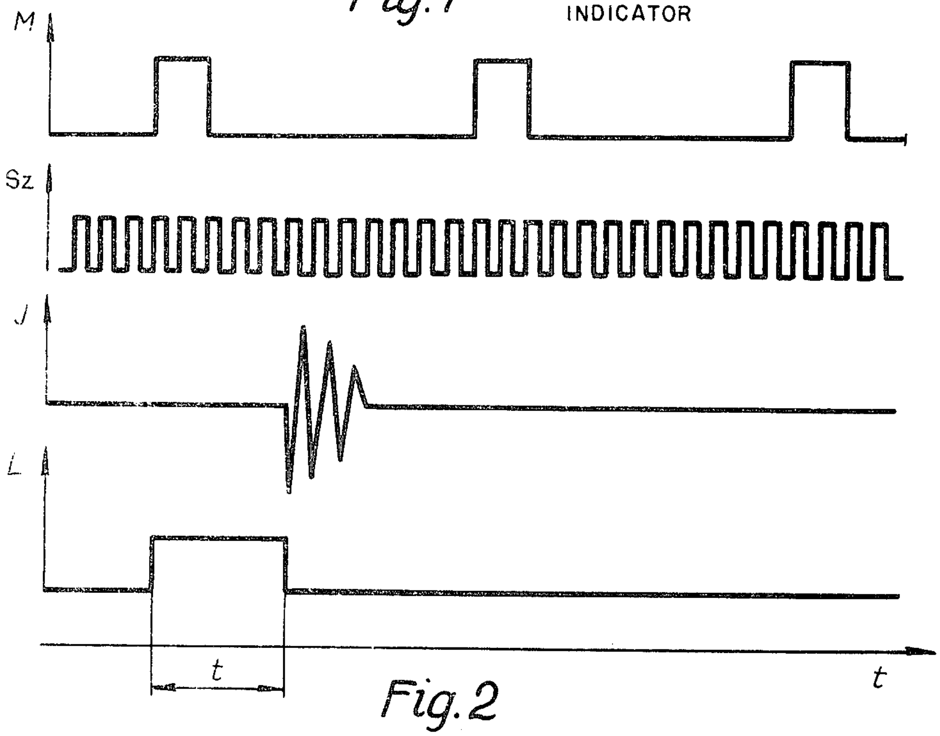

An exemplary manner of carrying out the process according to the invention, and an apparatus employed, are described below, wherein:

FIG. 1 is a block diagram of an exemplary apparatus for processing and registering electric signals given by a measuring sensor; and FIG. 2 shows diagrammatically the processed signals.

Referring to FIG. 1, in an internal-combustion piston engine, particularly a Diesel engine, operating with direct (solid) fuel injection, there is mounted a vibration accelerator transducer or sensor 1 on the fuel injection nozzle of the cylinder being tested (not shown), for example, by way of a permanent magnet, which sensor provides voltage signals J proportional to the mechanical vibrations (see FIG. 2). To ascertain the position of the angle of injection, an angular position reference signal M from the crankshaft of the engine is also taken e.g. in such a way that an electromagnetic signal generator is arranged on the crankshaft. On the motor block, i.e. on a stationary part, there is arranged a sensor adapted to generate electric signals or a pulse train during measurement.

The signal J emitted by the vibration acceleration transducer 1 contains also the vibrations of the injection nozzle which are not due to the impact of the nozzle needle. By means of a level comparator (for example, within unit 2) the oscillation signal component due to the impact of the needle valve is separated from signal J, which in case this is an ascending flank of a first half-wave signal with a largest amplitude and with the highest frequency.

The electric signals obtained from the measurement locations (e.g. when several sensors 1 are provided, one for each injection nozzle of an engine are evaluated with aid of the apparatus shown on FIG. 1, in which the unit 1 of the block diagram represents the oscillation acceleration sensor, 2 an amplifier and the mentioned selecting level comparator, 3 a reference signal generator, 4 a logic network, 5 a logic gate, 6 an angle or time signal generator, and 7 represents a counting and indicating apparatus, unit 8 being a plus-minus sign indicator.

The signal J of the transducer 1 is passed to the amplifier and selector-comparator 2 which separates the signals generated by the impact of the needle from the other vibrations of the engine and from the vibration signals originating from the environment and shapes a signal, which latter is passed to one input of the logic network 4. The other input thereof receives the reference signal M from the signal generator 3, which represents a known angular position — expediently a dead centre point — of the engine.

The logic circuitry suitably constructed for this purpose indicates a selected time interval $t$ (FIG. 2) between a first signal obtained from the opening of the injection nozzle and the arrival of the reference signal coordinated to the known angular position of the main shaft. During this time interval $t$, represented by a signal L, the gate 5 opens and the signals of the angle or time signal generator 6 are passed to the counter/indicator 7. Based on the sequence of the arrival of the signals the sense of the time interval is indicated by the sign indicator 8.

By counting the signals of the angle signal generator, mounted on the engine, during the selected time interval $t$, one obtains the position of the commencement of fuel injection in comparison with the angular position of the crankshaft within its angular displacement. By counting signals Sz of the clock signal generator 6 during this time interval $t$ the duration of the latter is obtained. This latter magnitude can be converted into an angular displacement by relating it to the time of one revolution of the engine:

$$K = (t/T). 360,$$

where
$t$ = time (sec)
$T$ = time of one revolution of the engine (sec)
$K$ = angular displacement (°)

According to experience the assumption of the impact or the needle valve as the starting point of the fuel injection involves only a negligible error which does not affect the accuracy of the measurement, compared with the normally permissible error margins in known engine testing processes.

What we claim is:

1. A process for determining the starting point of fuel injection in internal-combustion engines having a fuel-injection nozzle with a housing and a needle valve and a displacement limited by a stroke limiter, comprising the steps of: observing and consecutively registering vibrations and other noise phenomena arising from abutments of the needle in the valve against the stroke limiter, or full opening of the needle valve; and selecting the ascending flank of a first half-wave signal from that vibration; the registering being accomplished with a sensing element placed at least in the vicinity of the nozzle housing.

2. The process as defined in claim 1, further comprising the steps of comparing a first received signal, that indicates the opening of the nozzle, with a reference signal that represents a known angular position characteristic of the engine operation; and determining a pre-injection angle by generating a differential parameter.

3. The process as defined in claim 2, wherein the angular position is the dead center position of the main shaft of the engine.

4. The process as defined in claim 2, wherein the differential parameter relates to time.

5. The process as defined in claim 2, wherein the differential parameter relates to the angular displacement of the main shaft of the engine.

* * * * *